(12) United States Patent
Zeng et al.

(10) Patent No.: US 11,393,242 B2
(45) Date of Patent: Jul. 19, 2022

(54) DISPLAY APPARATUS WITH PINHOLE IMAGING

(71) Applicant: Shanghai Tianma Micro-Electronics Co., Ltd., Shanghai (CN)

(72) Inventors: Yang Zeng, Shanghai (CN); Feng Lu, Shanghai (CN); Haochi Yu, Shanghai (CN); Qing Zhang, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 36 days.

(21) Appl. No.: 16/453,928

(22) Filed: Jun. 26, 2019

(65) Prior Publication Data

US 2020/0242319 A1 Jul. 30, 2020

(30) Foreign Application Priority Data

Jan. 29, 2019 (CN) .......................... 201910084470.3

(51) Int. Cl.
| | |
|---|---|
| G06V 40/13 | (2022.01) |
| G06F 3/042 | (2006.01) |
| G06F 3/041 | (2006.01) |
| G06V 10/147 | (2022.01) |
| G06F 21/32 | (2013.01) |
| H04M 1/02 | (2006.01) |

(52) U.S. Cl.
CPC ........ *G06V 40/1318* (2022.01); *G06F 3/0412* (2013.01); *G06F 3/0421* (2013.01); *G06V 10/147* (2022.01); *G06V 40/1324* (2022.01); *G06F 21/32* (2013.01); *H04M 1/0266* (2013.01)

(58) Field of Classification Search
None
See application file for complete search history.

(56) References Cited

U.S. PATENT DOCUMENTS

| | | | |
|---|---|---|---|
| 2018/0012069 A1* | 1/2018 | Chung | ................. G06K 9/2036 |
| 2018/0040675 A1* | 2/2018 | Zeng | .................... H01L 27/3246 |
| 2018/0076268 A1* | 3/2018 | Wang | ................. H01L 27/1443 |

(Continued)

FOREIGN PATENT DOCUMENTS

| | | |
|---|---|---|
| CN | 107068726 A | 8/2017 |
| CN | 108073900 A | 5/2018 |
| CN | 108416247 A | 8/2018 |

*Primary Examiner* — Benjamin X Casarez
(74) *Attorney, Agent, or Firm* — Anova Law Group, PLLC

(57) ABSTRACT

A display apparatus is provided. The display apparatus includes a cover layer having a first surface and an opposing second surface along a first direction, and the first surface is a touch-control operation surface of the display apparatus. The display apparatus further includes a light-shielding layer including a plurality of light-transmitting pinholes, and a light-sensitive sensor layer. The light-transmitting pinholes include first and second light-transmitting pinholes adjacent to each other. An imaging area on the light-sensitive sensor layer corresponding to the first light-transmitting pinhole is a first imaging area. Sensing areas on the light-sensitive sensor layer for detecting images corresponding to the first and the second light-transmitting pinholes are a first and a second sensing areas, respectively. The first imaging area covers and exceeds the first sensing area, and the first imaging area is non- overlapped with the second sensing area.

17 Claims, 19 Drawing Sheets

(56) References Cited

U.S. PATENT DOCUMENTS

| | | | |
|---|---|---|---|
| 2018/0300525 A1* | 10/2018 | Fourre | G06K 9/00093 |
| 2019/0006440 A1* | 1/2019 | Sun | H01L 27/3248 |
| 2019/0179488 A1* | 6/2019 | Klenkler | G06F 3/0421 |
| 2019/0272408 A1* | 9/2019 | Ding | G06V 40/1318 |
| 2019/0311176 A1* | 10/2019 | Haddad | G06K 9/00046 |
| 2019/0354789 A1* | 11/2019 | Gu | G06K 9/00087 |
| 2020/0219915 A1* | 7/2020 | Kim | H01L 27/14623 |
| 2020/0279090 A1* | 9/2020 | He | G06K 9/00087 |
| 2020/0320267 A1* | 10/2020 | Zhang | G06K 9/0004 |
| 2021/0319197 A1* | 10/2021 | Chang | G06F 3/044 |

\* cited by examiner

DISPLAY APPARATUS WITH PINHOLE IMAGING

CROSS-REFERENCE TO RELATED APPLICATIONS

This application claims the priority of Chinese Patent Application No. 201910084470.3, filed on Jan. 29, 2019, the entire content of which is incorporated herein by reference.

FIELD OF THE DISCLOSURE

The present disclosure generally relates to the field of display technology and, more particularly, relates to a display apparatus.

BACKGROUND

Display devices, such as mobile phones, tablets and smart wearable devices, often have fingerprint recognition functions. Before operating a display device with the fingerprint recognition function, a user only needs to touch the display device with a finger to perform authority verification, which simplifies the authority verification process. Furthermore, with gradual increase in the scenarios of applying the fingerprint recognition function, areas configured for fingerprint recognition on the display devices have been developed from a certain region on the display device to full-screen recognition.

In the existing display devices based on optical technologies for fingerprint recognition, a light-sensitive sensor is formed based on semiconductor elements. The fingerprint detection is realized by utilizing the properties that the semiconductor elements generate leakage current when exposed to light. Specifically, light generated by a fingerprint recognition light source is reflected on a surface of the display device touch-controlled by a finger. The reflected light irradiates to the light-sensitive recognition sensor, which detects the light intensity change caused by the fluctuation in the ridges and valleys of the fingerprint, thereby forming a fingerprint spectrum. However, the precision in fingerprint recognition in the existing technologies still needs to be improved.

Therefore, there is a need to solve technical problems to provide a display apparatus to improve the prevision in fingerprint recognition on a display panel of the display apparatus.

BRIEF SUMMARY OF THE DISCLOSURE

In view of above, the present disclosure provides a display apparatus configured to realize fingerprint recognition based on the principle of pinhole imaging. The present disclosure may improve image uniformity and precision in fingerprint recognition on the display apparatus.

One aspect of the present disclosure provides a display apparatus. The display apparatus may include a cover layer including a first surface and a second surface opposing the first surface along a first direction. The first surface may be a touch-control operation surface of the display apparatus. The display apparatus may further include a light-shielding layer disposed on a side of the second surface away from the first surface along the first direction, where the light-shielding layer may include a plurality of light-transmitting pinholes. The display apparatus may further include a light-sensitive sensor layer disposed on a side of the light-shielding layer away from the cover layer along the first direction. The plurality of light-transmitting pinholes may include a first light-transmitting pinhole and a second light-transmitting pinhole adjacent to the first light-transmitting pinhole. An imaging area on the light-sensitive sensor layer corresponding to the first light-transmitting pinhole may be a first imaging area, and an area on the light-sensitive sensor layer configured to detect an image corresponding to the first light-transmitting pinhole may be a first sensing area. An area on the light-sensitive sensor layer configured to detect an image corresponding to the second light-transmitting pinhole may be a second sensing area. The first imaging area may cover and exceed the first sensing area, and the first imaging area may be non-overlapped with the second sensing area.

Other features and advantages of the present disclosure will become more apparent via a reading of detailed descriptions of non-limiting embodiments with reference to the accompanying drawings.

BRIEF DESCRIPTION OF THE DRAWINGS

The accompanying drawings, illustrating some embodiments of the present disclosures, constitute a part of the present disclosure. These accompanying drawings together with some of the embodiments will be described in the following to illustrate the technical solutions of the present disclosure.

DETAILED DESCRIPTION

Figure 1:
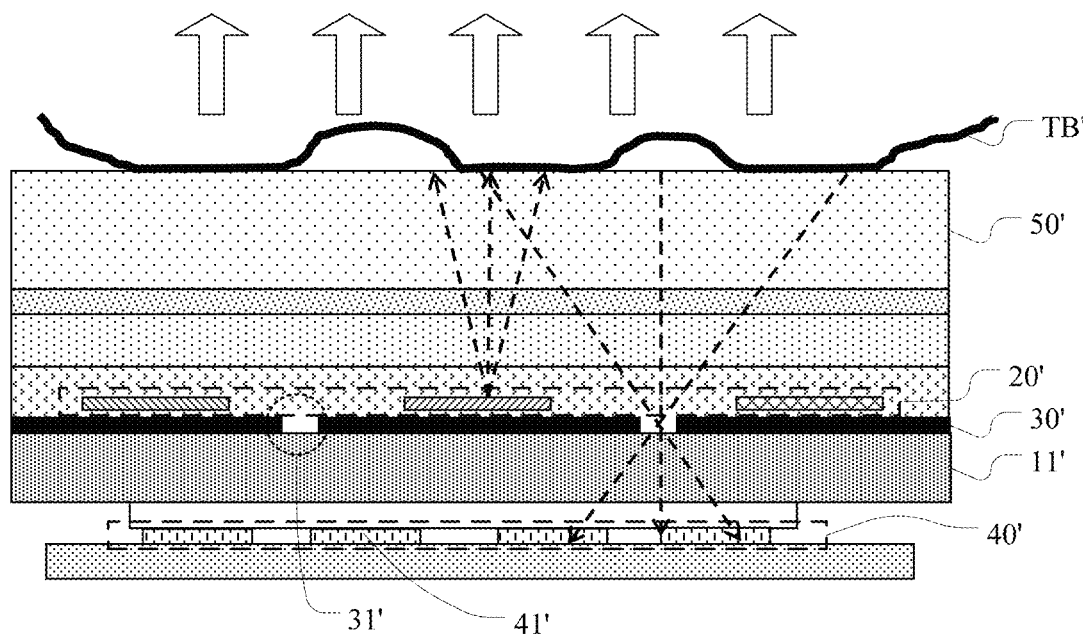
FIG. 1 illustrates a schematic diagram of film layer structures in display apparatuses.

Various embodiments of the present disclosure will be described in detail as follows with reference to the accompanying drawings. It should be noted that the arrangements of the elements and steps as described in these embodiments, as well as the numeric expressions and numeric values are not intended to limit the scope of the present disclosure, unless otherwise specified.

It should be understood that, the descriptions of exemplary embodiments disclosed herein are only for illustrative purpose, not intended to limit any scope of the embodiments of the present disclosure or the implementation of these embodiments.

The technologies, methods and devices that are known to one of ordinary skill in the art will not be described in detail herein, however under certain circumstances, any technology, method and device as disclosed herein should be viewed as part of the present disclosure.

Any numeric value described in exemplary embodiments of the present disclosure is only for illustrative purposes, not intended to be limiting. Accordingly, different numeric values may be applied in other exemplary embodiments of the present disclosure.

It should be noted that similar reference numerals and letters indicate similar items in the following drawings. Thus, once an item is defined in one drawing, it is unnecessary for the item to be further discussed in subsequent drawings.

FIG. 1 illustrates a schematic diagram of film layer structures in display apparatuses. With reference to FIG. 1, the display apparatus includes a base layer 11' and a light-emitting layer 20' disposed on a side of the base layer 11'. A cover layer 50' is disposed on a side of the light-emitting layer 20' away from the base layer 11'. A surface of the cover layer 50' is a touch-control operation surface of the display apparatus. The display apparatus further includes a light-sensitive sensor layer 40' and a light shielding layer 30' where a plurality of light-transmitting pinholes 31' are disposed. The light-emitting layer 20' is multiplexed as a fingerprint recognition light source. When light generated by the light-emitting layer 20' transmits to a touch surface between a fingerprint TB' and the cover layer 50', it reflects on the touch surface. The reflected light is incident to the light-sensitive sensor layer 40' through the light-transmitting pinholes 31'. When the aperture of the light-transmitting pinholes 31' is small enough, the fingerprint can be imaged on the light-sensitive sensor layer 40' based on the principle of pinhole imaging, thereby realizing the fingerprint recognition.

Figure 2:
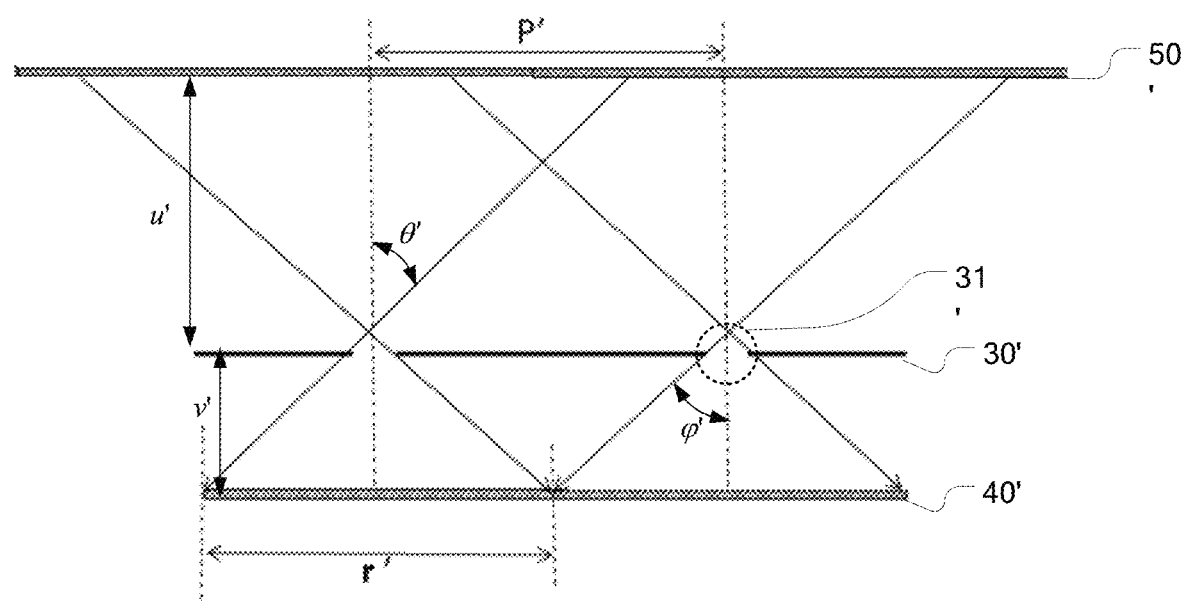
FIG. 2 illustrates a schematic diagram of imaging areas in display apparatuses.
Figure 3:
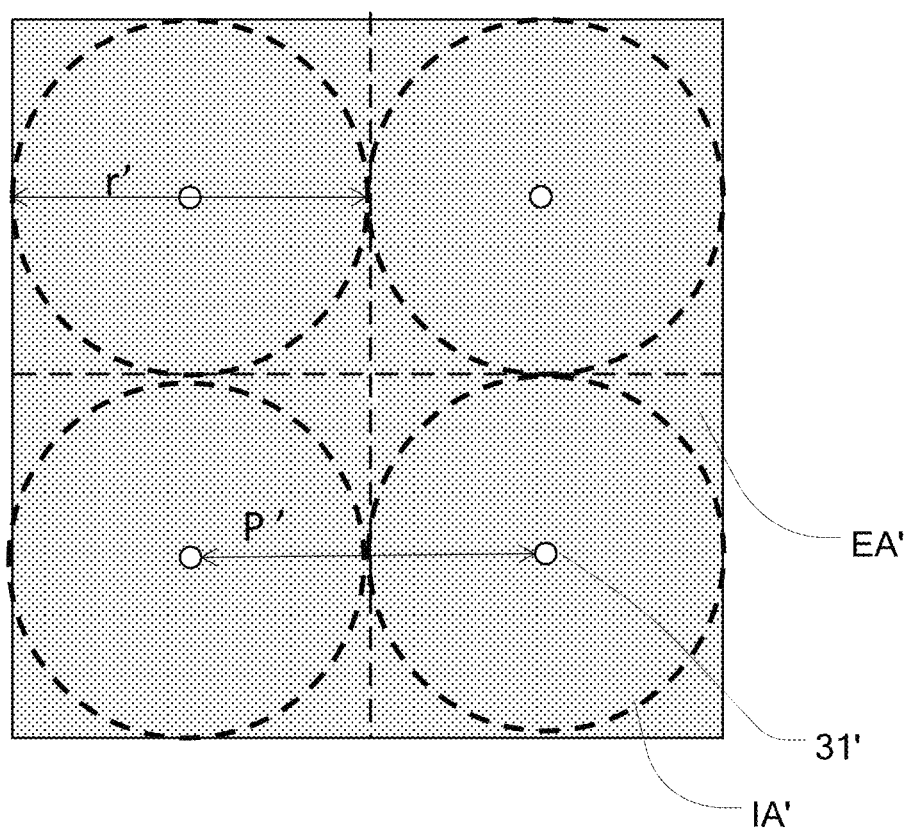
FIG. 3 illustrates another schematic diagram of imaging areas in display apparatuses.

FIGS. 2-3 illustrate schematic diagrams of imaging areas in display apparatuses. Using exemplary circular-shaped light-transmitting pinholes 31' with reference to FIGS. 2-3, with fixed parameters including a viewing angle of the light-transmitting pinholes and an object-to-image distance, one light-transmitting pinhole 31' forms an imaging area IA' on the light-sensitive sensor layer 40', where the imaging area IA' is a circular area with a radius of P'/2. The light-sensitive sensor layer 40' includes a plurality of light-sensitive sensors 41'. Further, a sensing area EA' is arranged corresponding to each of the imaging areas IA', and a plurality of light-sensitive sensors FS' is disposed in the sensing area EA'. The light-sensitive sensors 41' detect each of the imaging areas IA' and based upon the images detected in all of the sensing areas EA', to realize fingerprint recognition.

It is further found that for each light-transmitting pinhole 31', its corresponding imaging area IA' has uneven brightness at edge positions which is further prone to distortion, resulting in imprecise image detected in the sensing areas EA' and reduced precision in fingerprint recognition. In light of the display apparatus of existing technologies which has low precision in fingerprint recognition, the present disclosure provides a display apparatus. According to the present disclosure, the imaging areas corresponding to the light-transmitting pinholes may cover and exceed the sensing areas corresponding to the light-transmitting pinholes, thereby attenuating the problems of uneven brightness and distortion at edge positions of the images which may result in an imprecise image. Further, for two adjacent light-transmitting pinholes, an imaging area corresponding to any one of the two adjacent light-transmitting pinholes may be non-overlapped with a sensing area corresponding to the other one of the two adjacent light-transmitting pinholes. As such, it may be avoided to have light transmitted through one light-transmitting pinhole being incident to a sensing area corresponding to another light-transmitting pinhole, which may cause crosstalk between adjacent sensing areas. The display apparatus in accordance with various embodiments of the present disclosure will be described in greater details as follows.

Figure 4:
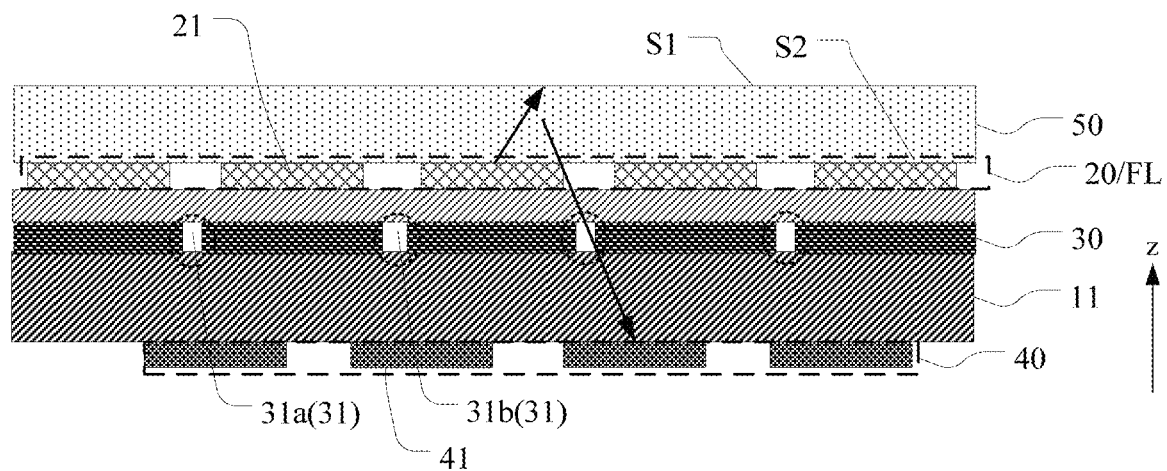
FIG. 4 illustrates a schematic diagram of film layer structures in an exemplary display apparatus according to various embodiments of the present disclosure.
Figure 5:
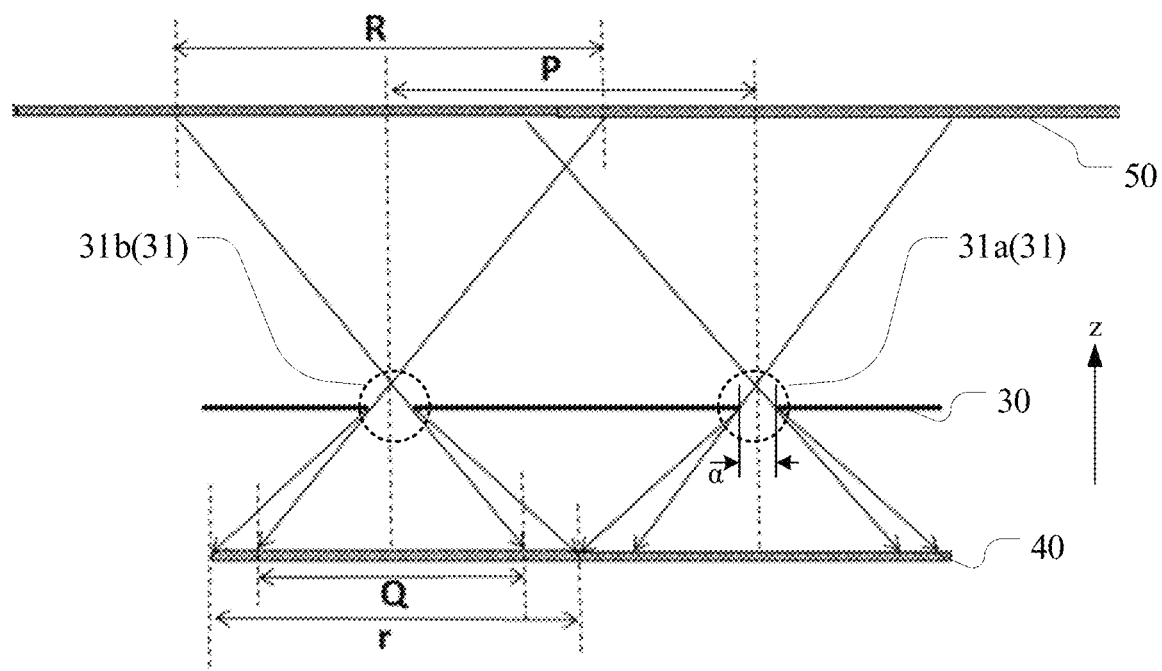
FIG. 5 illustrates a schematic diagram of imaging areas in an exemplary display apparatus according to various embodiments of the present disclosure.
Figure 6:
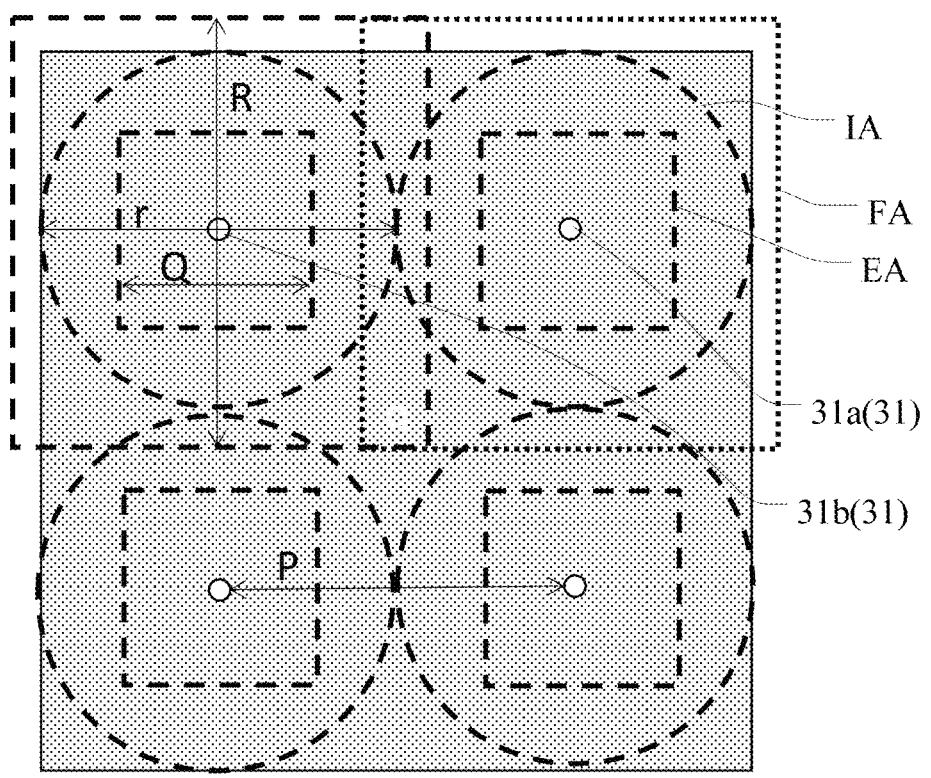
FIG. 6 illustrates a schematic diagram of imaging areas in another exemplary display apparatus according to various embodiments of the present disclosure.

FIG. 4 illustrates a schematic diagram of film layer structures in an exemplary display panel according to various embodiments of the present disclosure. FIG. 5 and FIG. 6 each illustrates a schematic diagram of imaging areas in an exemplary display panel according to various embodiments of the present disclosure. In one embodiment with reference to FIGS. 4-6, the display apparatus may include a cover layer 50, which may have a first surface S1 and a second surface S2 opposing the first surface S1 along a first direction z. The first surface S1 may be a touch-control operation surface of the display apparatus. A user may use fingers or a stylus pen to perform touch-control operations on the first surface S1 of the display apparatus. The display apparatus may further include a light-shielding layer 30 disposed on a side of the second surface S1 away from the first surface S1 along the first direction z. The light-shielding layer 30 may include a plurality of light-transmitting pinholes 31 through which light may transmit. The display apparatus may further include a light-sensitive sensor layer 40 disposed on a side of the light-shielding layer 30 away from the cover layer 50 along the first direction z. The display apparatus may further include a light-emitting layer 20 and a base layer 11, where the light-emitting layer 20 may include a plurality of light-emitting units 21. The light-emitting layer 20 may be disposed between the base layer 11 and the cover layer 50 along the first direction z. The plurality of light-emitting units 21 may emit light to realize the image display. Further, the plurality of light-emitting units 21 may be multiplexed as a fingerprint recognition light source FL.

It should be noted that the schematic diagrams of film layer structures in the exemplary display panel with reference to FIG. 4 as well as other drawings merely illustrate relative positional relationships between each of the film layers. In other embodiments of the present disclosure, other film layers may be disposed between the illustrated film layers. Furthermore, each film layer may be a patterned structure or a whole-layer structure based upon practical functions, for which the present disclosure will not intend to limit.

According to the embodiment of the present disclosure, the display apparatus may include the light-sensitive sensor layer 40 and the light-shielding layer 30 including the plurality of light-transmitting pinholes 31. When light generated by the fingerprint recognition light source FL transmits to a touch surface between the first surface S1 of the cover layer 50 and the finger, it may reflect on the touch surface. The reflected light may be incident to the light-sensitive sensor layer 40 through the light-transmitting pinholes 31. When the aperture of the light-transmitting pinholes 31 is sufficiently small, the fingerprint may be imaged on the light-sensitive sensor layer 40 based on the principle of pinhole imaging, thereby realizing fingerprint recognition.

In the embodiment, each of the light-transmitting pinholes 31 may form an image on an area on the light-sensitive sensor layer 40, where the area may be defined as an imaging area IA corresponding to each of the light-transmitting pinholes 31. Further corresponding to each imaging area IA, an area on the light-sensitive sensor layer 40 for detecting the formed image may be defined as a sensing area EA. Each sensing area EA may have a corresponding area on the touch-control operation surface S1 where an image of a fingerprint may be located. The corresponding area on the touch-control operation surface S1 may be a fingerprint area FA (see e.g., an area defined by dotted lines in FIG. 6). As disclosed herein, the terms "sensing area EA" and "effective sensing area EA" may be interchangeably used in the present disclosure. Often, edge portions of an image on an imaging area IA corresponding to a light-transmitting pinhole may be unclear or distorted, which may cause the image cannot be entirely recognized or read. A sensing area EA or an effective sensing area EA may thus refer to a portion of the imaging area excluding the unrecognizable edge portions.

With reference to FIGS. 5-6, an imaging area IA corresponding to a light-transmitting pinhole 31 may be a circular area with a diameter of r, and a sensing area EA corresponding to the light-transmitting pinhole 31 may be a square area with a side length of Q. A fingerprint area corresponding to the sensing area EA may be a square area with a side length of R.

Specifically for the plurality of light-transmitting pinholes 31 according to the embodiments of the present disclosure, any two adjacent light-transmitting pinholes 31 may be defined as a first light-transmitting pinhole 31a and a second light-transmitting pinhole 31b, respectively. An imaging area IA corresponding to the first light-transmitting pinhole 31a may be a first imaging area IA1, and a sensing area EA corresponding to the first light-transmitting pinhole 31a may be a first sensing area EA1. An imaging area IA corresponding to the second light-transmitting pinhole 31b may be a second imaging area IA2, and a sensing area EA corresponding to the second light-transmitting pinhole 31b may be a second sensing area EA2. The first imaging area IA1 may cover and exceed the first sensing area EA1, and the first imaging area IA1 may be non-overlapped with the second sensing area EA2. The second imaging area IA2 may cover and exceed the second sensing area EA2, and the second imaging area IA2 may not be overlapped with the first sensing area EA1. That is, for each of the light-transmitting pinholes 31, its corresponding imaging area IA may cover and exceed its corresponding sensing area EA. As such, the light-sensitive sensor layer 40 may only detect an image formed in a central region of the imaging area IA, thereby avoiding imprecise images due to uneven brightness and distortion at edge positions of the detected image. Further, for the first light-transmitting pinhole 31a and the second light-transmitting pinhole 31b adjacent to each other, the first imaging area IA1 corresponding to the first light-transmitting pinhole 31a may be non-overlapped with the second sensing area EA2 corresponding to the second light-transmitting pinhole 31b, thereby preventing light transmitted through the first light-transmitting pinhole 31a from being incident to the second sensing area EA2 corresponding to the second light-transmitting pinhole 31b which may cause crosstalk in the second sensing area EA2. The second imaging area IA2 corresponding to the second light-transmitting pinhole 31b may be non-overlapped with the first sensing area EA1 corresponding to the first light-transmitting pinhole 31a, thereby preventing light transmitted through the second light-transmitting pinhole 31b from being incident to the first sensing area EA1 corresponding to the first light-transmitting pinhole 31a which may cause crosstalk in the first sensing area EA1.

According to the embodiment of the present disclosure, each of the light-transmitting pinholes may have a corresponding imaging area covering and exceeding its corresponding sensing area, thereby attenuating the problems of uneven brightness and distortion at edge positions of the images which may result in an imprecise image, as well as improving the precision in fingerprint recognition. Further, for two adjacent light-transmitting pinholes, an imaging area corresponding to any one of the two adjacent light-transmitting pinholes may be non-overlapped with a sensing area corresponding to the other one of the two adjacent light-transmitting pinholes. As such, it may prevent light transmitted through one light-transmitting pinhole from being incident to a sensing area corresponding to another light-transmitting pinhole, which may cause crosstalk between adjacent sensing areas.

With further reference to the embodiments of the present disclosure, adjacent sensing areas EA, that is, a first sensing area EA1 and a second sensing area EA2, may be arranged to be in contact with each other. Alternatively, adjacent sensing areas EA may have intervals between each other. Further, the sensing area EA may have a square shape, a rectangular shape, a triangular shape or a hexagonal shape. Regardless what shape the sensing area EA may have, in some of the optional embodiments of the present disclosure, a geometric center of the sensing area EA may directly face the light-transmitting pinhole. That is, the geometric center of the sensing area EA may be overlapped with a geometric center of the imaging area IA corresponding to the light-transmitting pinhole. As such, the sensing area EA may detect an image located at a central region of the imaging area IA, which may further attenuate the problems of uneven brightness and distortion at edge positions of the image which may cause imprecise images, and further improving the precision in fingerprint recognition.

According to some of the optional embodiments of the present disclosure with further reference to FIG. 5, an aperture of a light-transmitting pinhole α may be greater than 5 µm and less than 20 µm, that is, 5 µm<α<20 µm.

In some of the optional embodiments, the display apparatus may include light-transmitting pinhole with an aperture α in the range from 5 µm to 20 µm. On one side, the aperture of the light-transmitting pinhole being less than 20 µm may ensure a sufficiently small size for the light-transmitting pinhole to realize pinhole imaging. On the other side, the aperture of the light-transmitting pinhole being greater than 5 µm may reduce the precision requirement during the manufacture process.

In some of the optional embodiments of the present disclosure with reference to FIG. 6, an orthogonal projection of the light-transmitting pinholes 31 on the light-sensitive sensor layer 40 may have a circular shape, and the aperture α of the light-transmitting pinholes 31 may be a diameter of the circle. Further, the orthogonal projection of the light-transmitting pinholes 31 on the light-sensitive sensor layer 40 may have an oval shape, and the aperture α of the light-transmitting pinholes 31 may be a long diameter of the oval. Additionally, the orthogonal projection of the light-transmitting pinholes 31 on the light-sensitive sensor layer 40 may have a polygonal shape or an irregular shape, and the aperture α of the light-transmitting pinholes 31 may be a distance between two of the farthest points on the edges of the pinholes. The imaging areas IA may have a same shape as the light-transmitting pinholes 31. Further in some of the optional embodiments, the orthogonal projection of the light-transmitting pinholes 31 on the light-sensitive sensor layer 40 may have a circular shape, an oval shape or a convex polygonal shape, which may reduce the influence of light diffraction and improve the precision in image detection.

In some of the optional embodiments of the present disclosure with further reference to FIG. 4, the light-emitting layer 20 may be disposed between the cover layer 50 and the light-shielding layer 30 along the first direction z. That is, the light-shielding layer 30 may be disposed on a side of the light-emitting layer 20 facing towards the base layer 11, thereby avoiding any influence of the light-shielding layer 30 on light emitting and image display of the display apparatus. Further, an orthogonal projection of the light-transmitting pinholes 31 on the light-emitting layer 20 may be located between adjacent light-emitting units 21, thereby preventing the light-emitting units 21 from blocking light transmitted through the light-transmitting pinholes 31.

Figure 7:
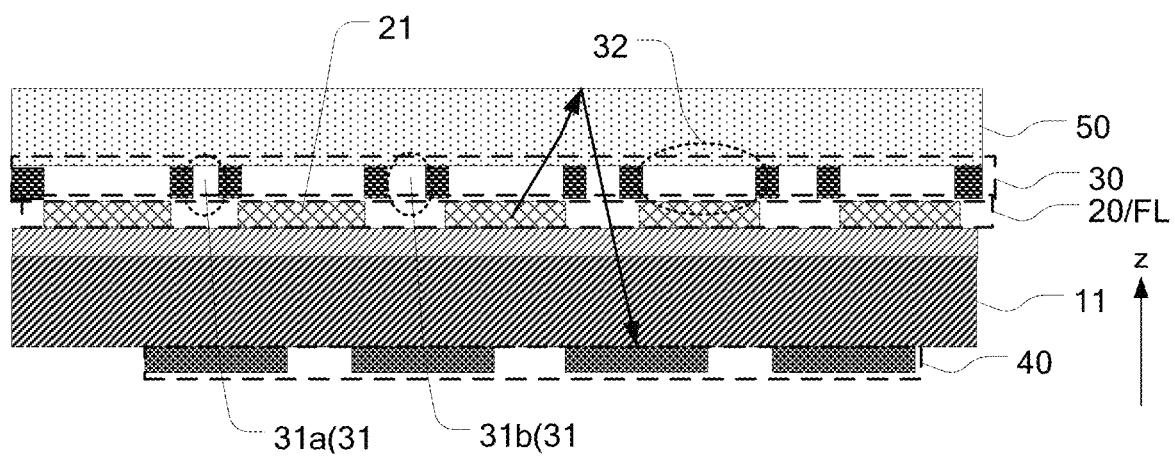
FIG. 7 illustrates a schematic diagram of film layer structures in another exemplary display apparatus according to various embodiments of the present disclosure.

FIG. 7 illustrates a schematic diagram of film layer structures in another exemplary display apparatus according to various embodiments of the present disclosure. In one embodiment with reference to FIG. 7, the light-shielding layer 30 may be disposed on a side of the light-emitting layer 20 away from the base layer 11. Accordingly, pixel holes 32 may be arranged on the light-shielding layer 30, where the pixel holes 32 may correspond to light-emitting units 21. As such, light generated by the light-emitting units 21 may exit from the pixel holes 32.

With reference to FIG. 4 and FIG. 7, no matter which side of light-emitting layer 20 the light-shielding layer 30 was disposed on, the light-sensitive sensor layer 40 may be disposed on a side of the light-shielding layer 30 away from the touch-control operation surface of the display apparatus. That is, the light-sensitive sensor layer 40 may be disposed on a side of the light-shielding layer 30 away from the cover layer 50. As such, it may be ensured that light reflected from the touch surface between the finger and the cover layer 50 may transmit through the light-transmitting pinholes 31, and be incident to the light-sensitive sensor layer 40. Additionally, to realize the pinhole imaging, it may be required to keep certain distance between the light-shielding layer 30 and the light-sensitive sensor layer 40, along a direction corresponding to the thickness of the display apparatus. Accordingly, in one embodiment of the present disclosure, the base layer 11 may be disposed between the light-shielding layer 30 and the light-sensitive sensor layer 40 along the first direction z.

According to the aforementioned embodiment of the present disclosure, at least the base layer 11 may be disposed between the light-sensitive sensor layer 40 and the light-shielding layer 30. For a display apparatus including a rigid display panel, the base layer 11 may be a glass substrate which may fulfill the distance requirement between the light-shielding layer 30 and the light-sensitive sensor layer 40. As such, it may not need additional layers to fulfill the distance requirement between the light-shielding layer 30 and the light-sensitive sensor layer 40. Additionally, it may make the display apparatus thin and light, by avoiding increasing the thickness of the display apparatus.

Figure 8:
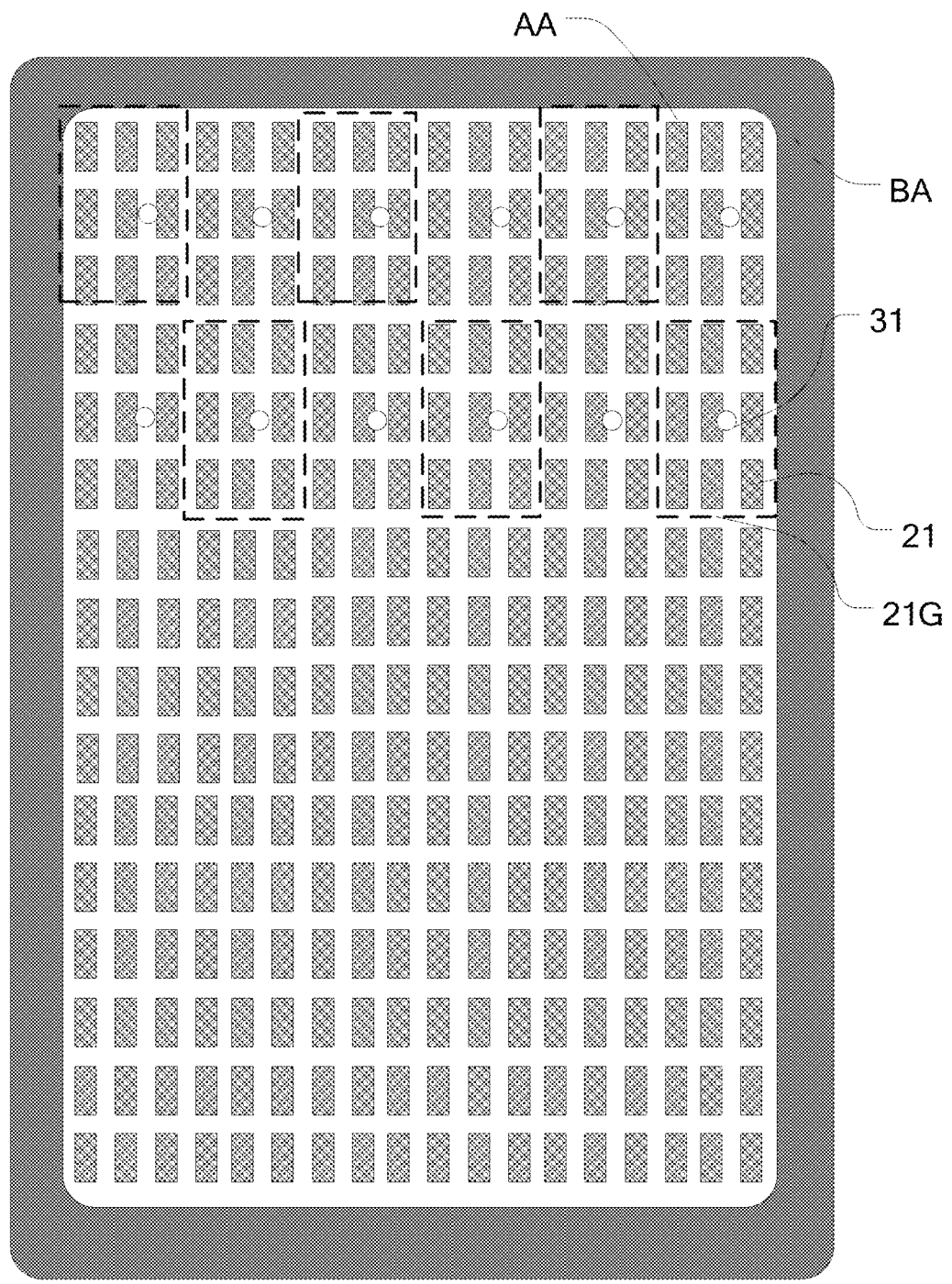
FIG. 8 illustrates a top view of an exemplary display apparatus according to various embodiments of the present disclosure.

According to the embodiments of the present disclosure, the arrangements of the light-transmitting pinholes may be referring to the arrangements of the light-emitting units. FIG. 8 illustrates a top view of an exemplary display apparatus according to various embodiments of the present disclosure. In one embodiment with reference to FIG. 8, the display apparatus may include a display area AA and a border area BA surrounding the display area AA. The light-emitting units 21 may be disposed in the display area AA. The display apparatus may be a regular display apparatus and correspondingly, the display area AA may be a regular display region having a rectangular shape. Alternatively, the display apparatus may be an irregular display apparatus having a circular shape or a ring shape. Optionally, a transparent area may be arranged on a display panel of the display apparatus, where the earpiece and camera module may be disposed. Further, a notch recessed into the display area may be disposed at an edge position of the display panel, or a corner of the display panel may have an arc shape. Regardless what shape or structure the disclosed display apparatus may have, all of the light-emitting units 21 in the display area AA may be arranged into a plurality of light-emitting unit groups 21G, and each light-emitting unit group 21G may include a plurality of light-emitting units 21. When arranging the light-transmitting pinholes 31, each light-emitting unit group 21G may correspond to one of the light-transmitting pinholes 31.

According to the embodiments of the present disclosure, the light-transmitting pinholes 31 may be arranged in correspondence with the light-emitting unit groups 21G, such that the light-transmitting pinholes may be regularly arranged on the display apparatus.

Figure 9:
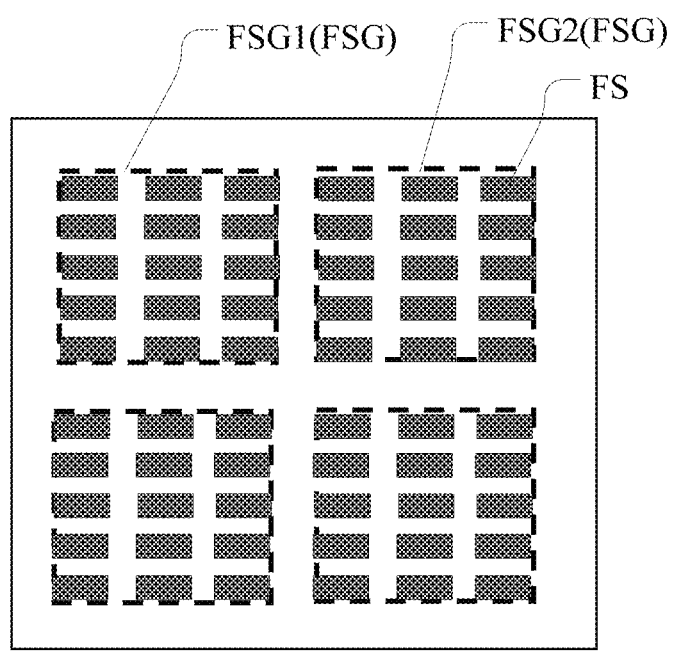
FIG. 9 illustrates a schematic diagram of a light-sensitive sensor layer in an exemplary display apparatus according to various embodiments of the present disclosure.

FIG. 9 illustrates a schematic diagram of a light-sensitive sensor layer in an exemplary display apparatus according to various embodiments of the present disclosure. In various embodiments with reference to FIGS. 5-6 and 9, the light-sensitive sensor layer may include a plurality of light-sensitive sensor groups FSG, and each light-sensitive sensor group FSG may include a plurality of light-sensitive sensors FS. An effective sensing area EA on the light-sensitive sensor layer 40 corresponding to each of the light-transmitting pinholes 31 may correspond to one of the light-sensitive sensor groups FSG. For example, a first effective sensing area EA1 on the light-sensitive sensor layer 40 corresponding to the first light-transmitting pinhole 31a may correspond to a first light-sensitive sensor group FSG1, and a second effective sensing area EA2 on the light-sensitive sensor layer 40 corresponding to the second light-transmitting pinhole 31b may correspond to a second light-sensitive sensor group FSG2.

According to the embodiments of the present disclosure, light-sensitive sensor groups including a plurality of light-sensitive sensors may be arranged in correspondence with the effective sensing areas of the light-transmitting pinholes. As such, the redundancy in the arrangements of the light-sensitive sensors may be avoided. Furthermore, when reading out an image of a fingerprint, the plurality of light-sensitive sensor groups may detect respectively. For example, a fingerprint recognition chip may read out signals detected by different light-sensitive sensor groups in a time-sharing manner, thereby reducing the amount of data process by the fingerprint recognition chip in a same time period.

Figure 10:
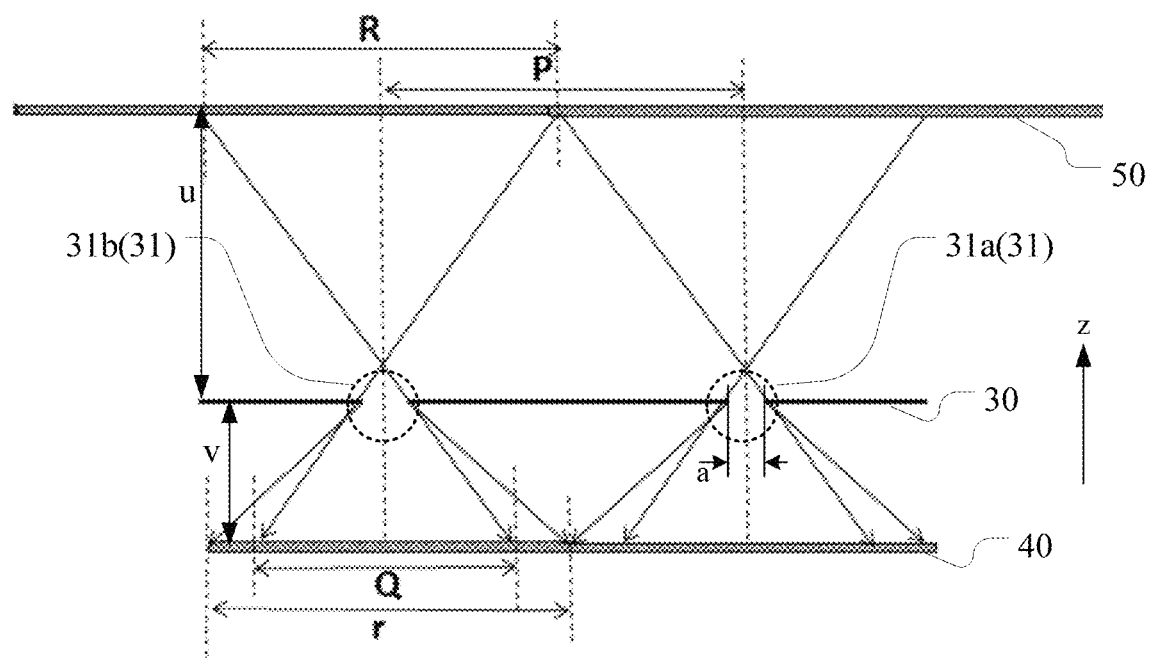
FIG. 10 illustrates a schematic diagram of imaging areas in another exemplary display apparatus according to various embodiments of the present disclosure.
Figure 11:
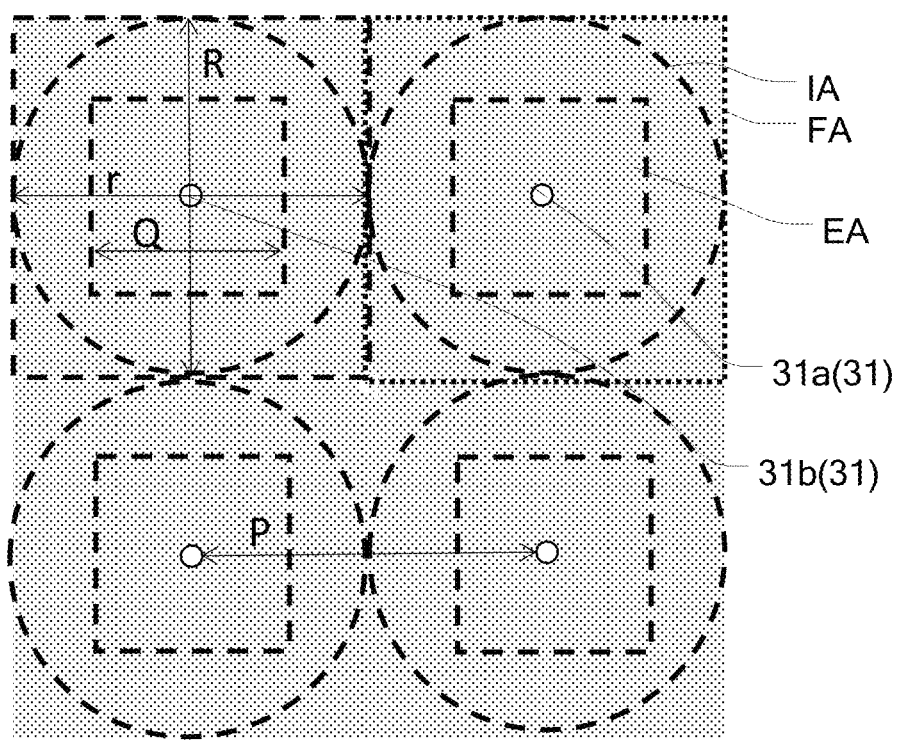
FIG. 11 illustrates a schematic diagram of imaging areas in another exemplary display apparatus according to various embodiments of the present disclosure.

FIG. 10 and FIG. 11 illustrate schematic diagrams of imaging areas of an exemplary display apparatus according to various embodiments of the present disclosure. In various embodiments with reference to FIGS. 10-11, touch-control areas detected by all of the plurality of light-transmitting pinholes 31 may be the fingerprint areas FA on the touch-control operation surface, where the fingerprint areas FA may have a fingerprint image which the corresponding sensing areas EA may detect. The boundaries of the touch-control areas may be connected. As such, the signals detected from the sensing areas EA corresponding to all of the light-transmitting pinholes 31 may be used to exactly recognize a complete fingerprint image. On one side, it may prevent the image of the fingerprint at a same position from being detected by two of the effective sensing areas EA, resulting in the redundancy in fingerprint recognition. On the other, it may prevent the image of the fingerprint at a certain position from being missed by all of the effective sensing areas EA, resulting in the reduced precision in fingerprint recognition.

As disclosed herein, an effective sensing area (on the light-sensitive sensor layer corresponding to a light-transmitting pinhole) and a touch-control area (detected by a corresponding light-transmitting pinhole) can each be understood as an area that an image formed thereon is effectively recognized through the corresponding light-transmitting pinhole by light-sensitive sensor(s) of the light-sensitive sensor layer under the corresponding light-transmitting pinhole.

According to the aforementioned embodiments of the present disclosure, the size of the effective sensing area EA corresponding to the light-transmitting pinholes 31 may be adjusted in order to realize the exact recognition of a complete fingerprint. It may avoid the fingerprint was repeatedly imaged which may cause redundancy or errors in fingerprint information, and it may reduce the work load in fingerprint detection and power consumption. Furthermore, it may fulfill the requirement of fingerprint recognition, and attenuate the problems of uneven brightness and distortion at edge positions of the image which may cause imprecise images, and further improving the precision in fingerprint recognition.

In another embodiment of the present disclosure with further reference to FIGS. 10-11, two adjacent light-transmitting pinholes 31 may have a distance of P between each other. A fingerprint area FA detected by each of the light-transmitting pinholes 31 may have a square shape with a side length of P. That is, the fingerprint area FA on the touch-control operation surface S1 corresponding to the sensing area EA, may have a square shape. The sensing area EA on the light-sensitive sensor layer 40 for detecting an image corresponding to each of the light-transmitting pinholes 31 may have a square shape with a side length of Q. Further, $Q=P\times v/u$, where u is a distance between the light-shielding layer 30 and the first surface S1 along the first direction z, and v is a distance between the light-sensitive sensor layer 40 and the light-shielding layer 30 along the first direction z. As such, the size of the effective sensing areas EA corresponding to the light-transmitting pinholes 31 may be arranged in order to exactly realize the recognition of a complete fingerprint. Optionally, an image with a reduced size may be formed in the sensing area EA of the light-sensitive sensor layer 40 through the light-transmitting pinhole 31, and the formed image may correspond to a fingerprint image on a fingerprint area FA on the touch surface S1, where the fingerprint area FA may correspond to the sensing area EA.

According to the embodiment of the present disclosure, the sensing areas EA on the light-sensitive sensor layer 40 for detecting the images formed through the plurality of light-transmitting pinholes 31 may be significantly away from the edge positions of the imaging areas IA corresponding to the light-transmitting pinholes 31, thereby preventing the images formed on the sensing areas EA corresponding to the fingerprint areas FA from being distorted or unclear. Further, for each of the light-transmitting pinholes 31, it may have a corresponding fingerprint area FA, a sensing area EA and an imaging area IA which may form an imaging unit. Adjacent imaging units may be non-overlapped with each other, thereby avoiding any influence between each other.

Figure 12:
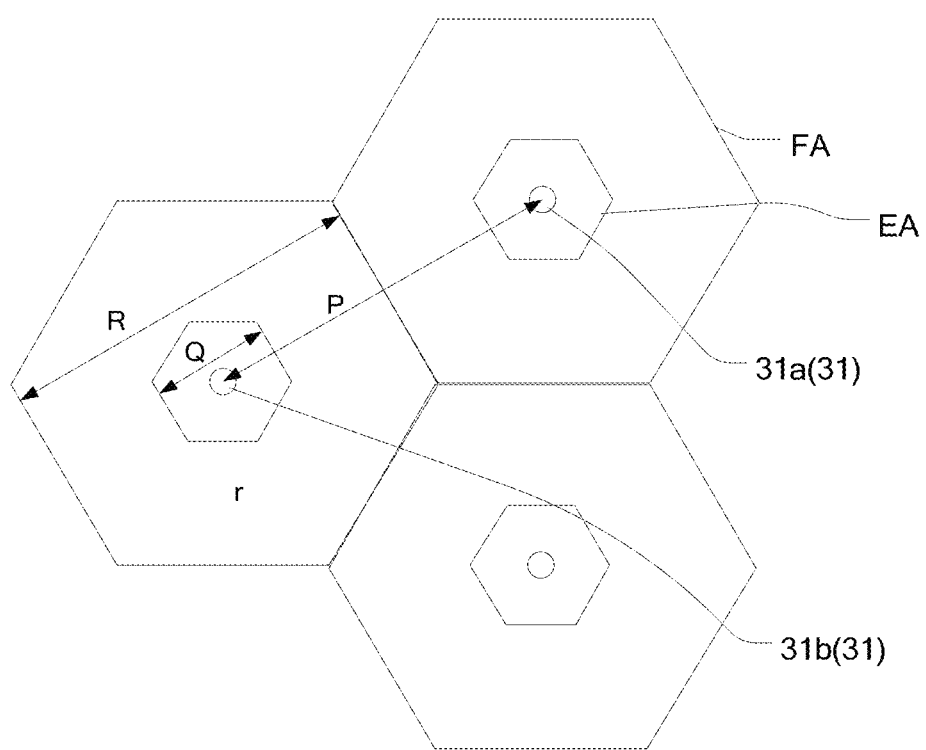
FIG. 12 illustrates a schematic diagram of imaging areas in another exemplary display apparatus according to various embodiments of the present disclosure.

FIG. 12 illustrates a schematic diagram of imaging areas in another exemplary display apparatus according to various embodiments of the present disclosure. In one embodiment with reference to FIGS. 10 and 12, adjacent light-transmitting pinholes 31 may have a distance of P. The touch-control area FA detected by each of the light-transmitting pinholes 31 may have a regular hexagonal shape, with a distance R between opposing sides of the regular hexagon equivalent to P (R=P). That is, the fingerprint area FA on the touch-control operation surface may have a regular hexagonal shape with a distance of P between two opposing sides of the regular hexagon, where the fingerprint area FA may have a fingerprint image detected by the corresponding sensing area EA. Further, the sensing area EA on the light-sensitive sensor layer 40 detecting the image formed through the light-transmitting pinhole 31 may have a regular hexagonal with a distance of Q between opposing sides of the regular hexagon. That is, each side of the regular hexagonal shape of the fingerprint area FA may be in parallel to a corresponding side of the regular hexagonal shape of the sensing area EA. In another word with reference to FIG. 12, the shapes of the fingerprint area FA, the sensing area EA and the imaging area IA corresponding to a light-transmitting pinhole 31 may be formed by zoom-in or zoom-out of a same regular hexagon, based on a geometric center of the regular hexagon. This regular hexagon may convert to the shapes of the fingerprint area FA, the sensing area EA and the imaging area IA, without rotation. Further, $Q=P\times v/u$, where u is a distance between the light-shielding layer 30 and the first surface S1 along the first direction z, and v is a distance between the light-sensitive sensor layer 40 and the light-shielding layer 30 along the first direction z. As such, the size of the effective sensing areas EA corresponding to the light-transmitting pinholes 31 may be arranged to exactly realize the recognition of a complete fingerprint.

In accordance with the aforementioned embodiments of the present disclosure, for each of the light-transmitting pinholes 31, its corresponding fingerprint area FA, sensing area EA and imaging area IA may form an imaging unit. An edge of the imaging unit may be viewed as an edge of the imaging area IA or an edge of the fingerprint area FA. Edges of adjacent imaging units may be straight-line edges, such that adjacent imaging units may be connected through the straight-line edges, thereby avoiding overlap between the imaging units and meanwhile, fully utilizing the space of the display panel to realize a dense arrangement of the imaging units. Furthermore, for each of the light-transmitting pinholes 31, its corresponding fingerprint area FA, sensing area EA and imaging area IA may each be a regular polygon, where the geometric centers of the regular polygons may be overlapped. As such, an imaging distance for the fingerprint area FA to form an image on the sensing area EA may be consistent with a minimum edge distance of the imaging area IA corresponding to the light-transmitting pinhole 31, thereby forming an image with uniform precision.

It should be noted that the circular shape of light-transmitting pinholes 31 according to the embodiments of the present disclosure with reference to FIGS. 11-12 are for exemplary purposes only. When the light-transmitting pinholes 31 have the circular shape, correspondingly, the imaging area IA of the light-transmitting pinholes 31 may have a circular shape with a diameter of r. It should be further noted that the light-transmitting pinholes 31 may have other shapes, for which the present disclosure will not intend to be limiting.

Figure 13:
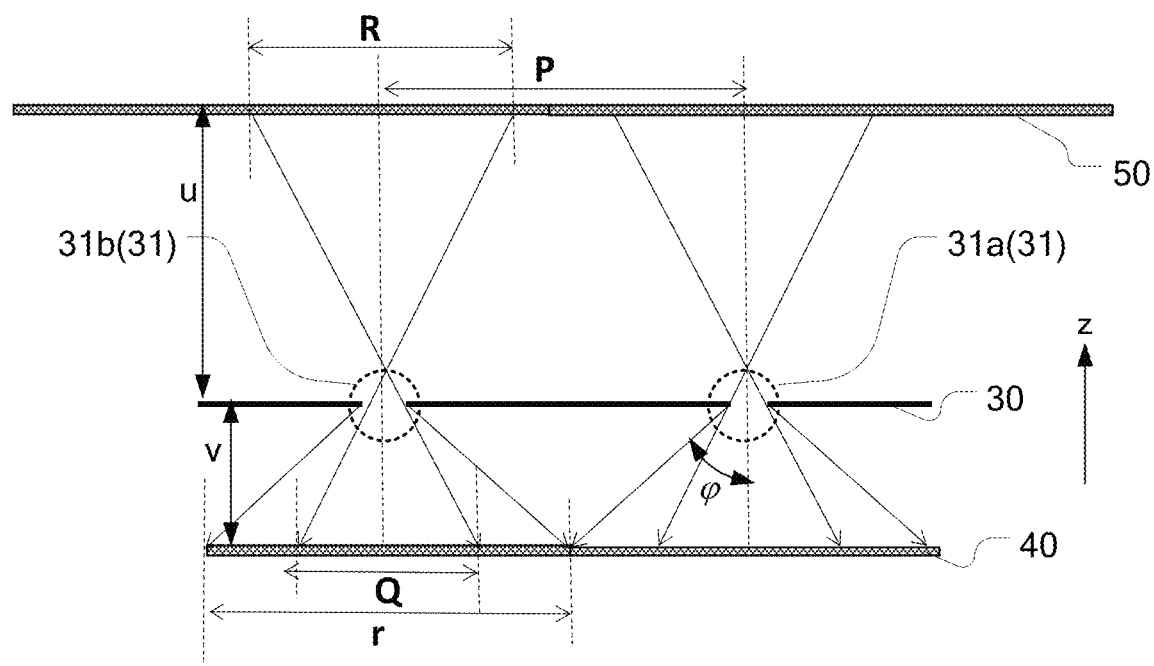
FIG. 13 illustrates a schematic diagram of imaging areas in another exemplary display apparatus according to various embodiments of the present disclosure.
Figure 14:
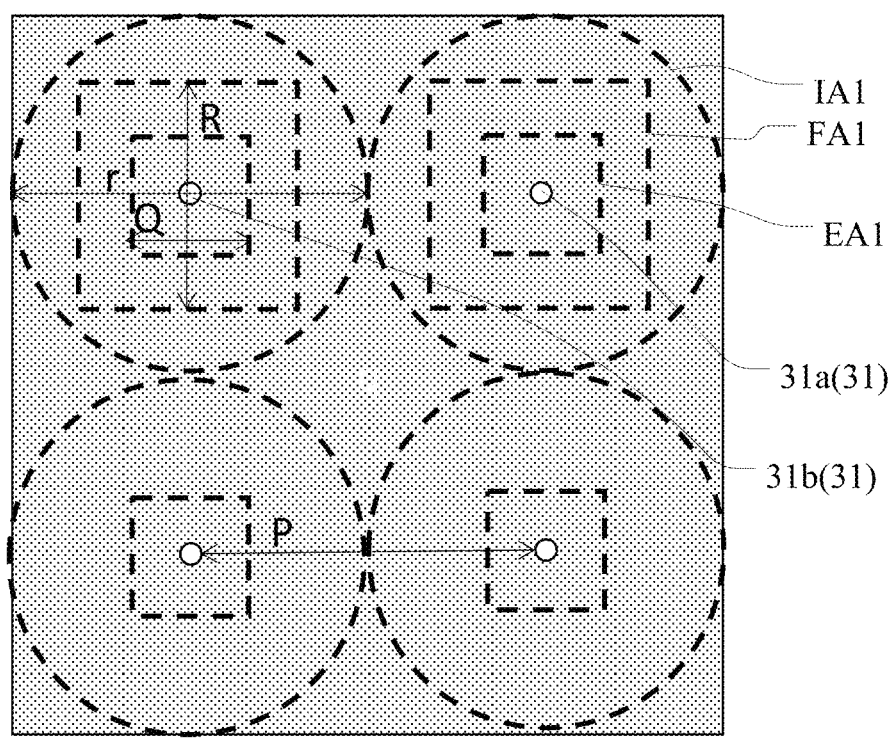
FIG. 14 illustrates a schematic diagram of imaging areas in another exemplary display apparatus according to various embodiments of the present disclosure.

FIG. 13 and FIG. 14 illustrate schematic diagrams of imaging areas in another exemplary display apparatus according to various embodiments of the present disclosure. In some of the optional embodiments with reference to FIGS. 13-14, the sensing areas corresponding to the light-transmitting pinholes 31, for example, a first sensing area EA1 corresponding to a first light-transmitting pinhole 31a, may detect a fingerprint image in a corresponding fingerprint area on the touch-control operation surface. Namely, the corresponding fingerprint area may be a first fingerprint area FA1. The first imaging area IA1 may at least cover an orthogonal projection of the first fingerprint area FA1 on the light-sensitive sensor layer 40. That is, for the first imaging area IA1 with a known size, the size of the first sensing area EA1 may be further reduced, such that the sensing area may be concentrated in a central region of the imaging area. It may further attenuate the problems of uneven brightness and distortion at edge positions of the image which may cause the formation of imprecise images.

With further reference to FIGS. 13-14, when the size of the sensing area was reduced, the size of the fingerprint area may also be reduced, that is, the fingerprint data acquired from each of the sensing areas may be reduced. Premised on fulfilling the precision requirement of fingerprint recognition, the data to be processed during fingerprint recognition may also be reduced.

Under the scenarios where high precision requirement for fingerprint recognition need to be fulfilled and meanwhile, the problems of forming imprecise images caused by uneven brightness and distortion at edge positions of the images may further need to be attenuated. Moreover, it may need to prevent the boundaries of the acquired fingerprint images from being disconnected to each other. It is further found that for two adjacent light-transmitting pinholes, their corresponding imaging areas may be overlapped. That is, the distance between adjacent light-transmitting pinholes may be reduced, as long as an imaging area corresponding to one light-transmitting pinhole may be non-overlapped with sensing areas corresponding to other light-transmitting pinholes.

Figure 15:
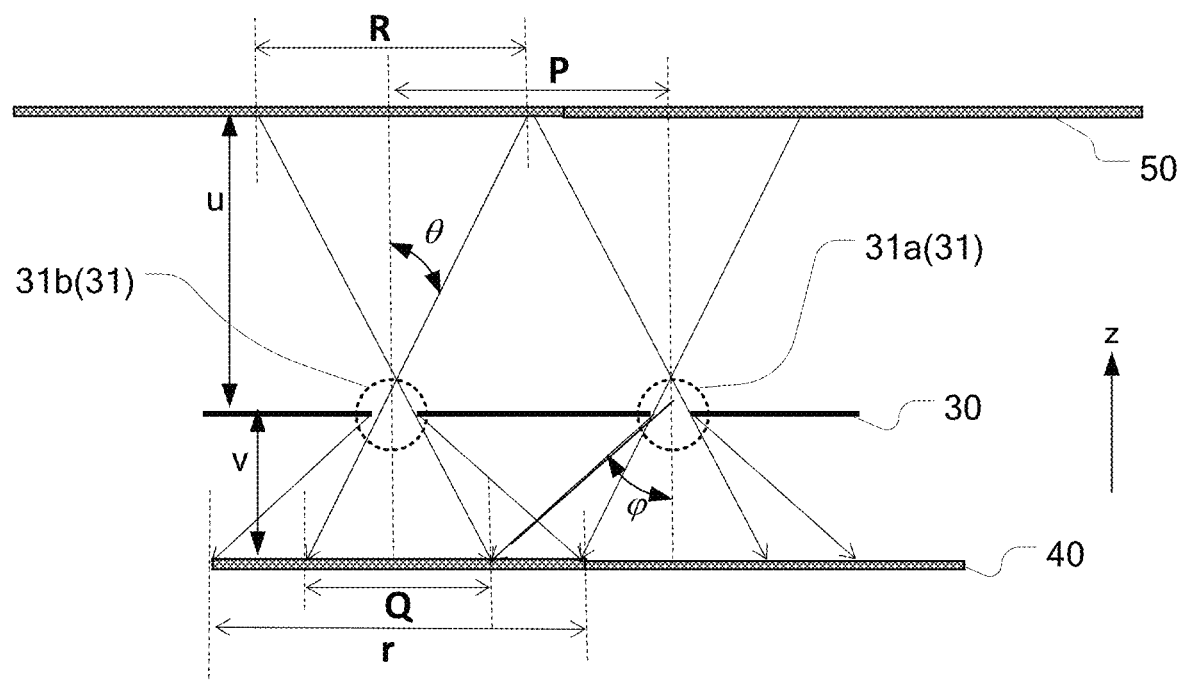
FIG. 15 illustrates a schematic diagram of imaging areas in another exemplary display apparatus according to various embodiments of the present disclosure.
Figure 16:
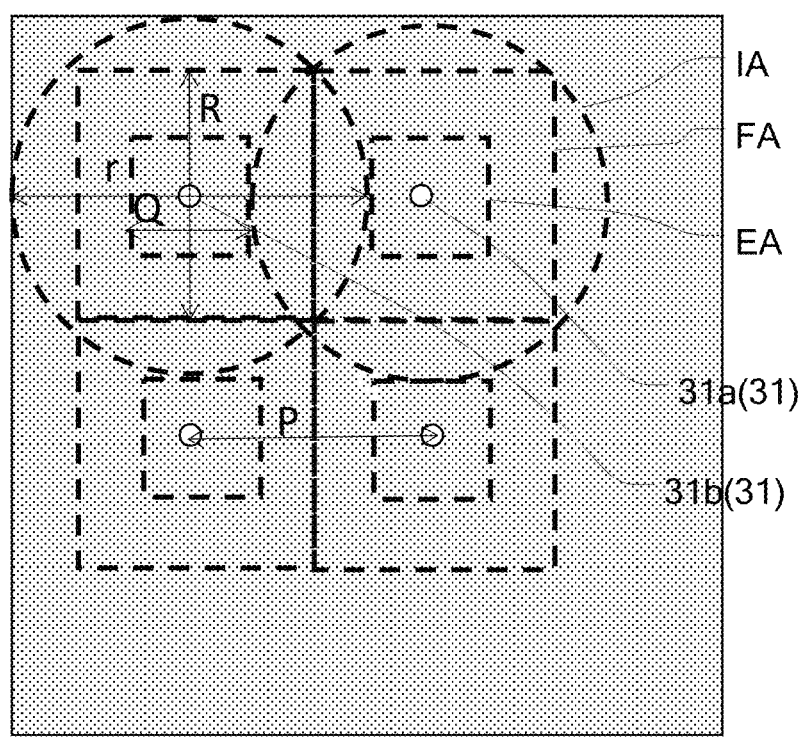
FIG. 16 illustrates a schematic diagram of imaging areas in another exemplary display apparatus according to various embodiments of the present disclosure.

FIG. 15 and FIG. 16 illustrate schematic diagrams of imaging areas in another exemplary display apparatus according to various embodiments of the present disclosure. In some of the optional embodiments with reference to FIGS. 15-16, $$2v\tan\varphi \times \frac{u}{2u-v} < P < 2v\tan\varphi,$$

where P may be a distance between a first light-transmitting pinhole 31a and a second light-transmitting pinhole 31b, u may be a distance between the light-shielding layer 30 and the first surface S1 along the first direction z, v may be a distance between the light-sensitive sensor layer 40 and the light-shielding layer 30 along the first direction z, and y may be a view angle of the light-transmitting pinholes 31.

With reference to FIGS. 2-3, for example, when the imaging areas IA' corresponding to adjacent light-transmitting pinholes 31' are non-overlapping with each other, $$\frac{P'}{2} = \frac{r'}{2} > v'\tan\varphi'.$$

With reference to FIGS. 15-16, when the imaging areas IA corresponding to adjacent light-transmitting pinholes 31 are overlapped with each other, $$\frac{P}{2} = \frac{r}{2} < v\tan\varphi,$$

that is, $P < 2 v \tan \varphi$.

To ensure that no gap existed among all of the fingerprint areas FA, it may be required that the boundaries of the fingerprint areas FA corresponding to adjacent light-transmitting pinholes 31 are at least connected, that is, R may be at least equivalent to P. Generally, for a display apparatus, an object distance u may be less than an image distance v (u<v). As such, the fingerprint area FA may form an inverted image with reduced size on the light-sensitive sensor layer 40. That is, the sensing area EA may be smaller than the fingerprint area FA. Accordingly, related formulas are listed as follows.

$$Q = P \times \frac{v}{u} < P, \quad \text{(Formula 1)}$$

$$\frac{r}{2} = v\tan\varphi, \quad \text{(Formula 2)}$$

where Formula 2 may be obtained based on a geometric relationship with reference to FIG. 15, $$\frac{r}{2} < P - \frac{Q}{2}, \quad \text{(Formula 3)}$$

where Formula 3 may be configured to prevent an imaging area corresponding to one light-transmitting pinhole 31 from overlapping with sensing areas corresponding to other light-transmitting pinholes 31, $$2v\tan\varphi \times \frac{u}{2u-v} < P,\quad\text{(Formula 4)}$$

where Formula 4 may be obtained by substituting Formula 1 and Formula 2 into Formula 3, and $$2v\tan\varphi \times \frac{u}{2u-v} < P < 2v\tan\varphi.\quad\text{(Formula 5)}$$

That is, a distance of P between adjacent light-transmitting pinholes 31 may fulfill Formula 5. On one side, the distance between the light-transmitting pinholes 31 may be reduced, which may increase the density of the light-transmitting pinholes 31 and improve the precision in image formation. On the other side, according to the embodiments of the present disclosure, the imaging areas IA corresponding to adjacent light-transmitting pinholes 31 may be overlapped with each other, without affecting adjacent sensing areas EA. As such, the crosstalk during the image formation may be avoided. In view of above according to various embodiments of the present disclosure, the described display apparatus may have increased density of light-transmitting pinholes 31 and improved uniformity in formed images. Meanwhile, the overlap between imaging areas may not cause crosstalk during the image sensing.

For display apparatuses with reference to FIGS. 2-3, u=1250 μm, v=400 μm, φ=41.8°, and P>715.3 μm, where the view angle is limited by a total reflection angle of the air layer. According to the various embodiments of the present disclosure with reference to FIGS. 15-16, 425.8 μm<P<715.3 μm. Based on a geometrical relationship, a maximum incident angle of the light transmitting along the edges of the sensing areas EA may be referred as $$\theta = \arctan\left(\frac{\sqrt{2}\,P}{2u}\right).$$

Based on the calculation, the maximum incident angle in existing technologies is 22°, while the maximum incident angle according to various embodiments of the present disclosure may be 13.5°. Since an intensity of an image is proportional to the fourth power of cos θ, a ratio between an intensity of edge positions of the image to an intensity of a central region of the image in existing technologies and the present disclosure may be 74% and 90%, respectively. That is, the various embodiments of the present disclosure may effectively improve uniformity in formed images.

Figure 17:
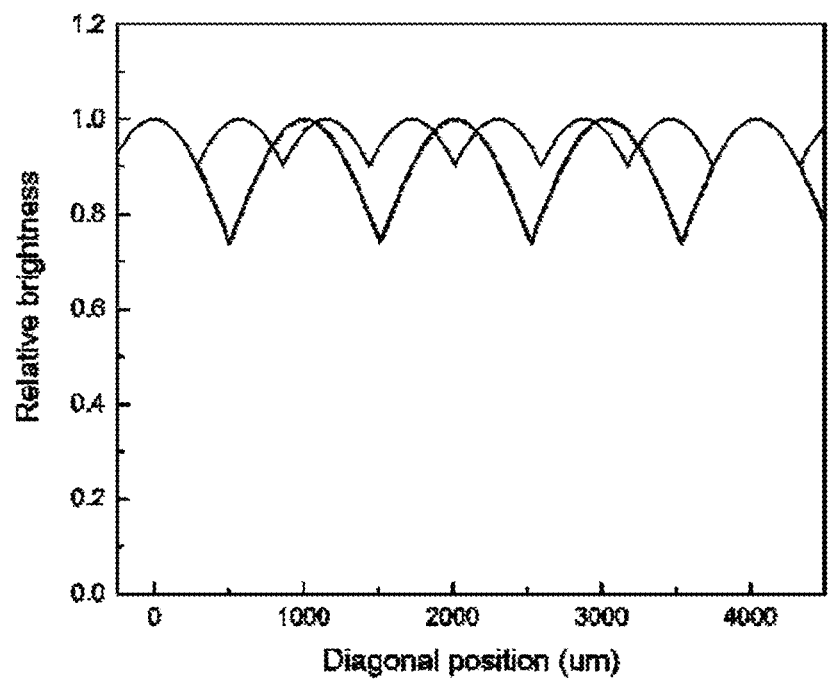
FIG. 17 illustrates comparison in positional intensity change between an exemplary display apparatus according to various embodiments of the present disclosure and a display apparatus of existing technologies.

FIG. 17 illustrates comparison in positional intensity change between an exemplary display apparatus according to various embodiments of the present disclosure and a display apparatus of existing technologies. A horizontal axis of FIG. 17 is a diagonal position along a diagonal direction of a square fingerprint area with a unit of micrometer. A vertical direction of FIG. 17 is a relative intensity which is a dimensionless parameter. The wavy lines in FIG. 17 indicate the intensity change in correspondence with positions. The wavy line close to the horizontal axis with large fluctuation corresponds to the intensity change in the display apparatus of existing technologies, and the wavy line far away from the horizontal axis with small fluctuation corresponds to the intensity change in the exemplary display apparatus according to various embodiments of the present disclosure. As can be seen from the comparison between two wavy lines in FIG. 17, it is found that the display apparatus according to the present disclosure may effectively improve uniformity in formed images.

In some of the optional embodiments of the present disclosure, any two adjacent light-transmitting pinholes 31 may have a distance of P. As such, the imaging uniformity may be improved at any position of the fingerprint image in the described display apparatus.

Figure 18:
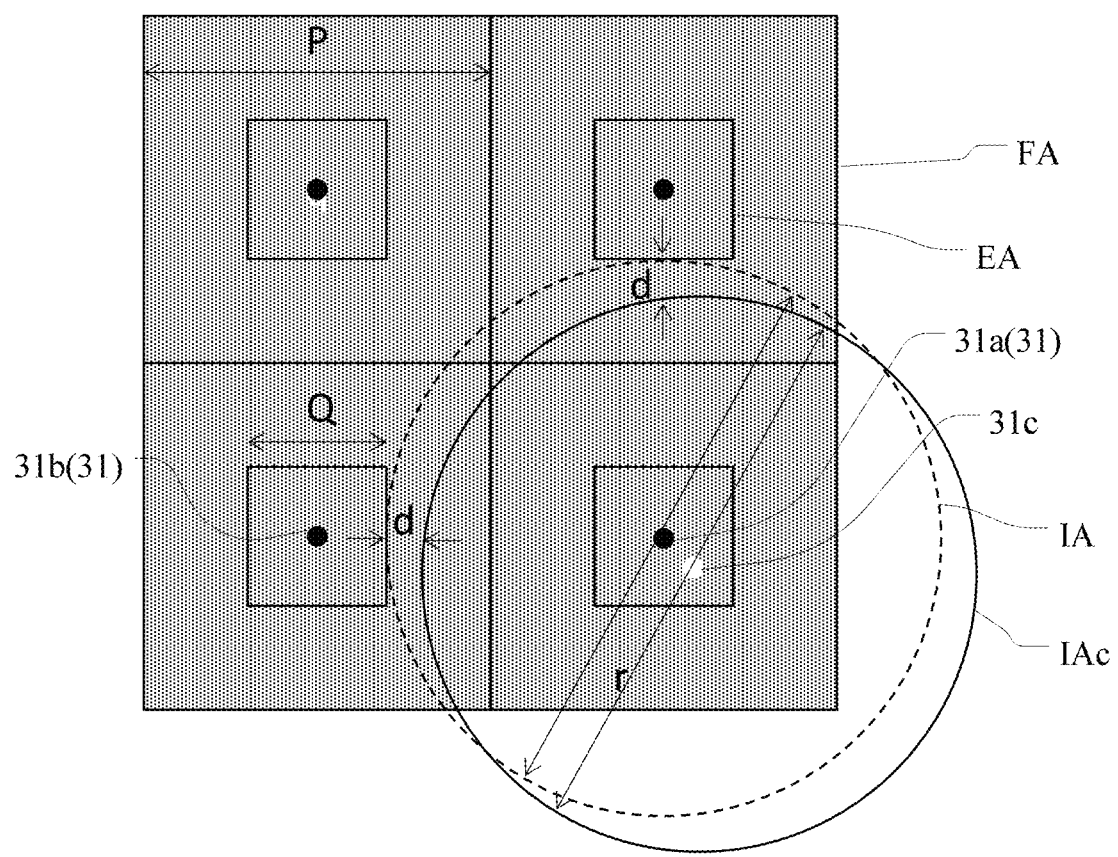
FIG. 18 illustrates a schematic diagram of imaging areas in another exemplary display apparatus according to various embodiments of the present disclosure.

FIG. 18 illustrates a schematic diagram of imaging areas in another exemplary display apparatus according to various embodiments of the present disclosure. In some of the optional embodiments of the present disclosure with reference to FIG. 18, to ensure the quality and uniformity of the images even in the presence of assembly tolerance, an imaging area IA corresponding to each of the light-transmitting pinholes 31 may have a distance from a sensing area EA corresponding to an adjacent light-transmitting pinhole 31, where the distance may be at least greater than a distance of d. That is, an imaging area IA may have a distance from adjacent sensing area, and the distance may be may be at least greater than the distance of d. Based on such distance, a distance between adjacent light-transmitting pinholes may be converted as $$2(v\tan\varphi + d) \times \frac{u}{2u-v} < P < 2v\tan\varphi,$$

where d is a preset distance, and satisfies the formula $$0 < d < \frac{(1-v)P}{2u}.$$

That is, d may be greater than zero, and less than a minimum distance between the sensing area EA and the fingerprint area FA.

According to the embodiments of the present disclosure, when arranging the distance between light-transmitting pinholes, assembly tolerance may be considered, in order to prevent the assembly tolerance from causing an image corresponding to one light-transmitting pinhole 31 be formed in a sensing area corresponding to an adjacent light-transmitting pinhole which may cause crosstalk.

In some of the optional embodiments of the present disclosure with further reference to FIG. 18, the preset distance d may be greater than 40 μm and less than 100 μm (40<d<100 μm). On one side, it may fulfill the precision requirement in assembly, thereby avoiding an image corresponding to a light-transmitting pinhole formed in a sensing area corresponding to an adjacent light-transmitting pinhole which may cause crosstalk. On the other side, it may maximize the reduction in the distance between adjacent light-transmitting pinholes, thereby increasing the density of light-transmitting pinholes and improving the precision in fingerprint recognition.

Figure 19:
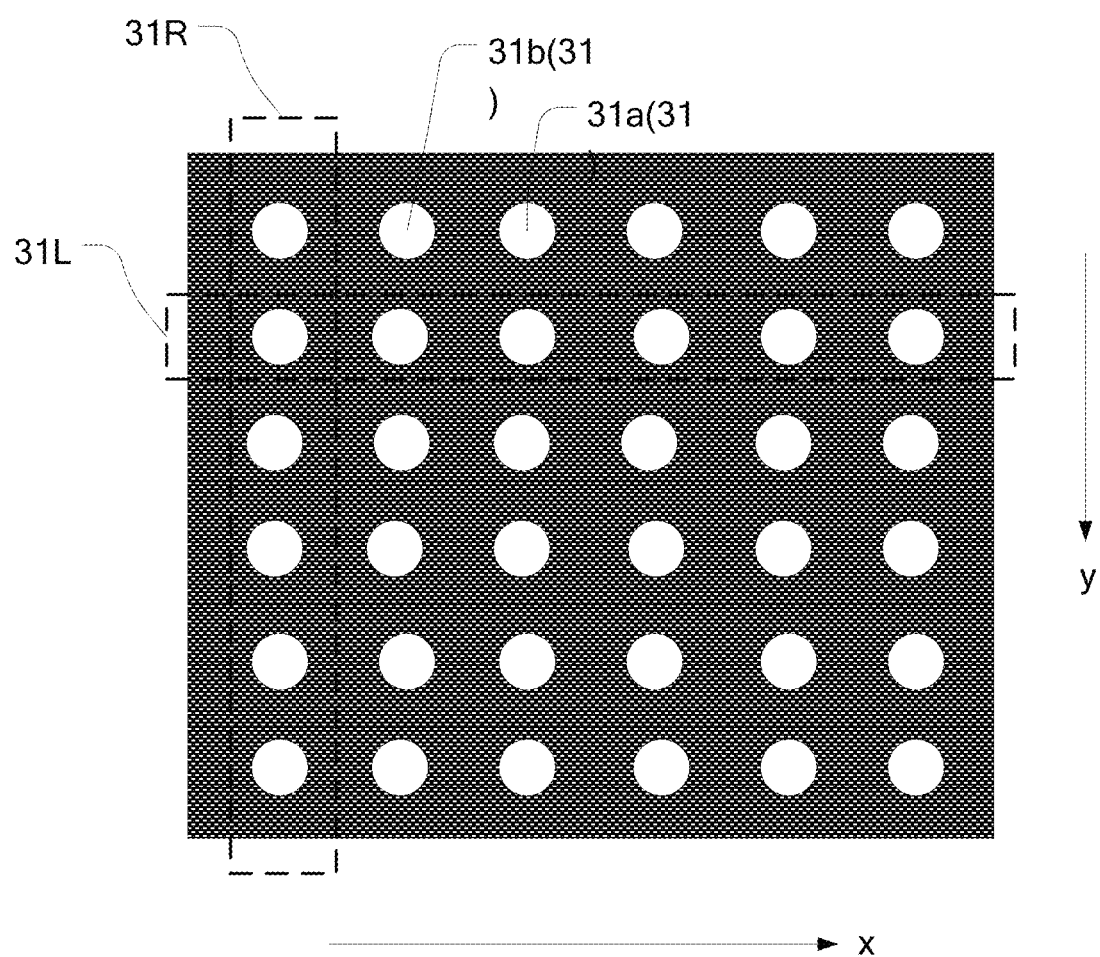
FIG. 19 illustrates a schematic diagram of light-transmitting pinholes in another exemplary display apparatus according to various embodiments of the present disclosure.
Figure 20:
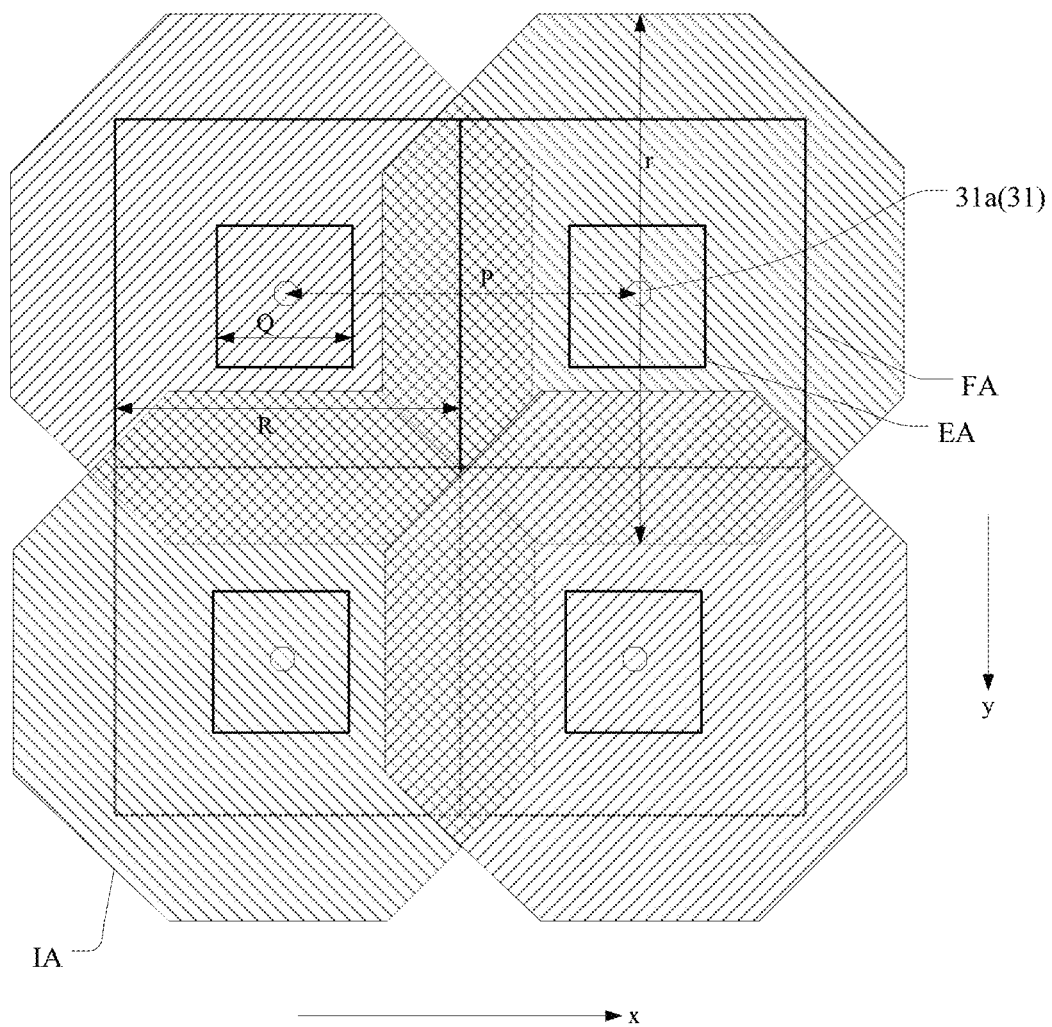
FIG. 20 illustrates a schematic diagram of imaging areas in another exemplary display apparatus according to various embodiments of the present disclosure.

With respect to detailed arrangements of the light-transmitting pinholes, FIG. 19 illustrates a schematic diagram of light-transmitting pinholes in another exemplary display apparatus according to various embodiments of the present disclosure. In one embodiment with reference to FIG. 19, a plurality of light-transmitting pinholes may be sequentially arranged into a plurality of pinhole rows 31L along a second direction x. Further, the plurality of light-transmitting pinholes may be sequentially arranged into a plurality of pinhole columns 31R along a third direction y. The second direction x may be perpendicular to the third direction y, and both the second direction x and the third direction y may be perpendicular to the first direction z. According to the embodiments of the present disclosure, the light-transmitting pinholes on the light-shielding layer may be regularly arranged in a simplified manner. During the formation of the light-transmitting pinholes, it may only require a simplified manufacture process. FIG. 20 illustrates a schematic diagram of imaging areas in another exemplary display apparatus according to various embodiments of the present disclosure. As disclosed, In some of the optional embodiments with reference to FIG. 20, an effective sensing area EA on the light-sensitive sensor layer corresponding to the light-transmitting pinhole 31, as well as a touch-control area FA detected by the light-transmitting pinhole 31, may both have a square shape. An orthogonal projection of the light-transmitting pinhole 31 on the light-sensitive sensor layer 40 may have an octagonal shape, that is, an imaging area IA corresponding to the light-transmitting pinhole 31 may have an octagonal shape.

In one embodiment with further reference to FIG. 20, four light-transmitting pinholes 31 located in two adjacent pinhole rows and two adjacent pinhole columns may form a pinhole group. Within the pinhole group, two of the four light-transmitting pinholes 31 may be located at different pinhole rows and different pinhole columns, and the imaging areas IA on the light-sensitive sensor layer 40 corresponding to these two light-transmitting pinholes 31, respectively, may be non-overlapping with each other.

According to the embodiment of the present disclosure, it may be ensured that the image formed on the light-sensitive sensor layer may be close to a central region of the imaging area. Meanwhile, the area of the display apparatus may be sufficiently utilized. Further, it may be ensured that an overlapping portion among the imaging areas may not be formed by more than two imaging areas. That is, it may not exist any overlapping portion formed by three or four of the imaging areas, thereby avoiding high intensity in the overlapping portion and complexity of the light in the overlapping portion which may influence the fingerprint recognition.

In one embodiment with further reference to FIG. 20, an orthogonal projection of the plurality of light-transmitting pinholes 31 on the light-sensitive sensor layer 40 may have a regular octagonal shape. Correspondingly, the imaging area IA corresponding to the plurality of light-transmitting pinholes 31 may also have a regular octagonal shape. It may be ensured that an overlapping portion among the imaging areas may not be formed by more than two of the imaging areas and the boundaries of the sensing areas may be connected.

Figure 21:
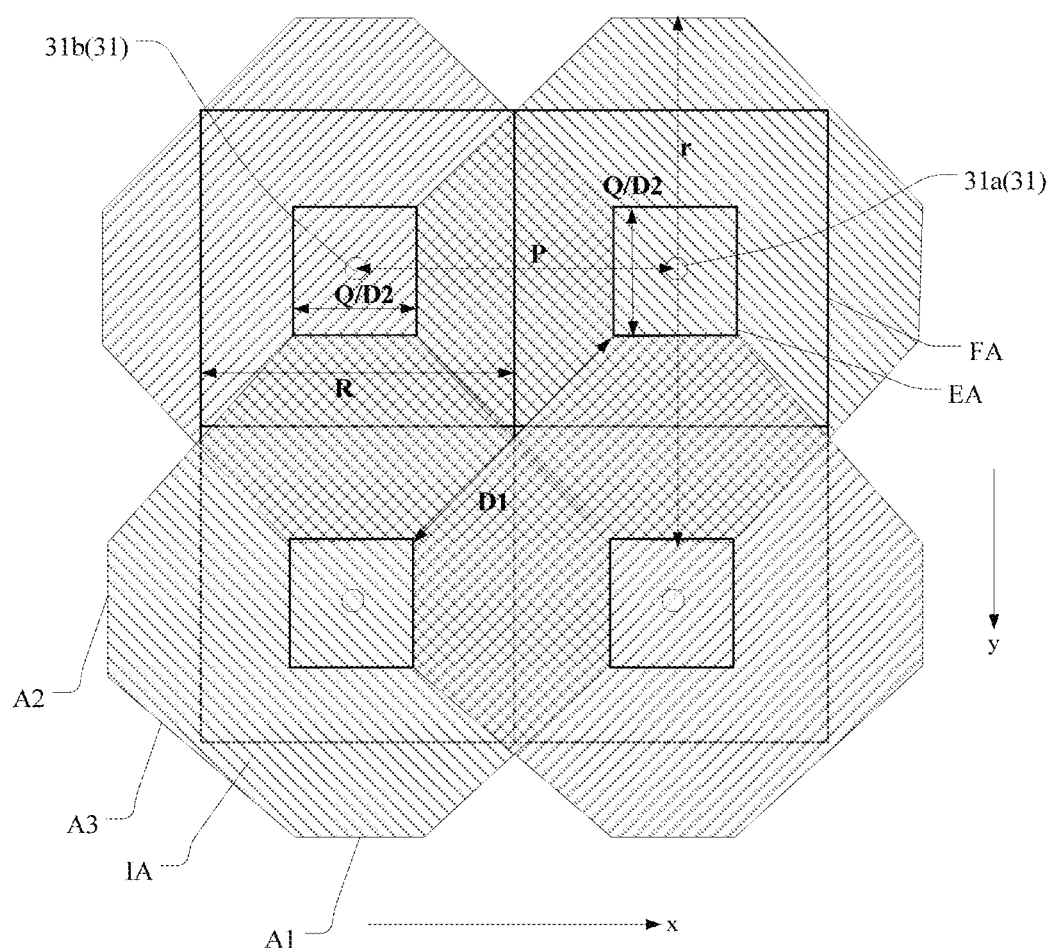
FIG. 21 illustrates a schematic diagram of imaging areas in another exemplary display apparatus according to various embodiments of the present disclosure.

FIG. 21 illustrates a schematic diagram of imaging areas in another exemplary display apparatus according to various embodiments of the present disclosure. In one embodiment with reference to FIG. 21, an imaging area IA on the light-sensitive sensor layer 40 corresponding to the plurality of light-transmitting pinholes may have a geometric center, and the geometric center of the imaging area IA may overlap with a geometric center of the effective sensing area EA on the light-sensitive sensor layer 40 corresponding to the plurality of light-transmitting pinholes. Further, the imaging area IA may have an octagonal shape, wherein the octagonal shape may include two of first sides A1 extending along the second direction x, and opposing along the third direction y, two of second sides A2 extending along the third direction y, and opposing along the second direction x, as well as four of third sides A3 connecting the first sides A1 and the second sides A2. Furthermore, two of the four light-transmitting pinholes included in the pinhole group located at different pinhole rows and different pinhole columns may have effective sensing areas EA. A minimum distance between the effective sensing areas EA may have a first length of D1, and the side length Q of the effective sensing areas EA may have a second length of D2. The first side A1 and the second side A2 each may have a length equivalent to the second length of D2, and the third side A3 may have a length equivalent to the first length of D1. As such, it may be ensured that an overlapping portion among the imaging areas may not be formed by more than two of the imaging areas and the boundaries of the sensing areas may be connected.

As disclosed herein, the display apparatus according to the aforementioned embodiments of the present disclosure may have at least the following beneficial effects. The imaging areas corresponding to the light-transmitting pinholes may be configured to cover and exceed the sensing areas corresponding to the light-transmitting pinholes. As such, it may attenuate the problems of uneven brightness and distortion at edge positions of the images which may cause the formation of imprecise images, thereby improving the precision in fingerprint recognition. Furthermore, for two adjacent light-transmitting pinholes, an imaging area corresponding to any one of the two light-transmitting pinholes may be non-overlapped with a sensing area corresponding to the other one of the two light-transmitting pinholes. As such, it may be avoided to have light transmitted through one light-transmitting pinhole being incident to a sensing area corresponding to another light-transmitting pinhole, causing the crosstalk between adjacent sensing areas.

Apparently, it is unnecessary for any one of the various embodiments of the present disclosure to simultaneously achieve each of the beneficial effects as disclosed above.

Although the present disclosure has been described in detail with reference to the foregoing embodiments, it is readily apparent to one ordinary skill in the art that the foregoing embodiments as described are merely for explanatory purpose, and not intended to be limiting. It is also apparent to one ordinary skill in the art that these embodiments may be modified or substituted, without departing from the scope of the various embodiments of the present disclosure. Instead, the scope of the present disclosure is defined by appended claims.

What is claimed is:

1. A display apparatus, comprising:
   a cover layer including a first surface and a second surface opposing the first surface along a first direction, wherein the first surface is a touch-control operation surface of the display apparatus;
   a light-shielding layer disposed, along the first direction, on a side of the second surface away from the first surface, wherein the light-shielding layer includes a plurality of light-transmitting pinholes; and
   a light-sensitive sensor layer disposed, along the first direction, on a side of the light-shielding layer away from the cover layer, wherein:
   the plurality of light-transmitting pinholes includes a first light-transmitting pinhole and a second light-transmitting pinhole adjacent to the first light-transmitting pinhole, a circular imaging area on the light-sensitive sensor layer corresponding to the first light-transmitting pinhole is a first imaging area,
a circular imaging area on the light-sensitive sensor layer corresponding to the second light-transmitting pinhole is a second imaging area,
the first imaging area overlaps with the second imaging area,
an area on the light-sensitive sensor layer detecting an image corresponding to the first light-transmitting pinhole is a first sensing area,
an area on the light-sensitive sensor layer detecting an image corresponding to the second light-transmitting pinhole is a second sensing area,
the first imaging area covers and exceeds the first sensing area,
no portion of a perimeter of the first imaging area overlaps with the first sensing area,
the first imaging area is non-overlapped with the second sensing area, and $$\frac{r}{2} < P - \frac{Q}{2},$$

wherein r is a diameter of the circular imaging area on the light-sensitive sensor layer corresponding to the first light-transmitting pinhole, P is a distance between the first light-transmitting pinhole and the second light-transmitting pinhole, and an area on the light-sensitive sensor layer detecting an image corresponding to each of the plurality of light-transmitting pinholes has a square shape with a side length of Q.

2. The display apparatus according to claim 1, wherein:
an area including a fingerprint image on the touch-control operation surface, corresponding to the first sensing area, is a first fingerprint area, and
the first imaging area at least covers an orthogonal projection of the first fingerprint area on the light-sensitive sensor layer.

3. The display apparatus according to claim 2, wherein:

$$2v\tan\varphi \times \frac{u}{2u-v} < P < 2v\tan\varphi,$$

where:
u is a distance between the light-shielding layer and the first surface along the first direction,
v is a distance between the light-sensitive sensor layer and the light-shielding layer along the first direction, and
φ is a view angle of the plurality of light-transmitting pinholes.

4. The display apparatus according to claim 3, wherein:
a distance between any two adjacent light-transmitting pinholes is P.

5. The display apparatus according to claim 3, wherein:

$$2(v\tan\varphi + d) \times \frac{u}{2u-v} < P < 2v\tan\varphi, \text{ and } 0 < d < \frac{(1-v)P}{2u},$$

where d is a preset distance.

6. The display apparatus according to claim 5, wherein:
40 μm<d<100 μm.

7. The display apparatus according to claim 1, wherein:
the plurality of light-transmitting pinholes has an aperture α, and
5 μm<α<20 μm.

8. The display apparatus according to claim 1, wherein:
an orthogonal projection of the plurality of light-transmitting pinholes on the light-sensitive sensor layer has a circular shape.

9. The display apparatus according to claim 1, wherein:
all boundaries of touch-control areas corresponding to the plurality of light-transmitting pinholes are connected.

10. The display apparatus according to claim 9, wherein:

$$Q = P \times \frac{v}{u},$$

where u is a distance between the light-shielding layer and the first surface along the first direction, and v is a distance between the light-sensitive sensor layer and the light-shielding layer along the first direction.

11. The display apparatus according to claim 1, further comprising:
a light-emitting layer disposed between the cover layer and the light-shielding layer along the first direction, wherein the light-emitting layer includes a plurality of light-emitting units, and an orthogonal projection of each of the plurality of light-transmitting pinholes on the light-emitting layer is located between adjacent light-emitting units closest to the orthogonal projection of each of the plurality of light-transmitting pinholes on the light-emitting layer, and an orthogonal projection of each of the plurality of light-transmitting pinholes on the light-emitting layer has no overlap with the plurality of light-emitting units.

12. The display apparatus according to claim 11, wherein:
the light-emitting layer includes a plurality of light-emitting unit groups, and each of the plurality of light-emitting unit groups, corresponding to one of the plurality of light-transmitting pinholes, includes a plurality of the light-emitting units.

13. The display apparatus according to claim 1, further comprising:
a base layer disposed between the light-shielding layer and the light-sensitive sensor layer along the first direction.

14. The display apparatus according to claim 1, wherein:
the light-sensitive sensor layer includes a plurality of light-sensitive sensor groups,
each of the plurality of light-sensitive sensor groups includes a plurality of light-sensitive sensors, and
an effective sensing area corresponding to each of the plurality of light-transmitting pinholes on the light-sensitive sensor layer corresponds with one of the plurality of light-sensitive sensor groups.

15. The display apparatus according to claim 1, wherein:
the plurality of light-transmitting pinholes are arranged into a plurality of pinhole rows along a second direction, and a plurality of pinhole columns along a third direction,
the second direction and the third direction are perpendicular to the first direction,
the second direction is perpendicular to the third direction,
an effective sensing area on the light-sensitive sensor layer corresponding to the plurality of light-transmitting pinholes, and a touch-control area detected by the plurality of light-transmitting pinholes each has a square shape, and an orthogonal projection of the plurality of light-transmitting pinholes on the light-sensitive sensor layer has a circular shape.

16. The display apparatus according to claim 15, wherein:

four of the plurality of light-transmitting pinholes located at two adjacent pinhole rows and two adjacent pinhole columns form a pinhole group, two of the four light-transmitting pinholes included in the pinhole group are located at different pinhole rows and different pinhole columns, and image areas on the light-sensitive sensor layer corresponding to the two of the four light-transmitting pinholes, respectively, are non-overlapped with each other.

17. The display apparatus according to claim 16, wherein:

an imaging area on the light-sensitive sensor layer corresponding to the plurality of light-transmitting pinholes has a geometric center, and the geometric center of the imaging area overlaps with a geometric center of the effective sensing area on the light-sensitive sensor layer corresponding to the plurality of light-transmitting pinholes, the imaging area has a circular shape, the two of the four light-transmitting pinholes included in the pinhole group located at the different pinhole rows and the different pinhole columns have effective sensing areas.

* * * * *